(12) United States Patent
Joly

(10) Patent No.: US 7,347,307 B2
(45) Date of Patent: Mar. 25, 2008

(54) INTEGRATED DAMPING ADJUSTMENT VALVE

(75) Inventor: Fabrice Joly, Revigliasco d'Asti (IT)

(73) Assignee: Arvin Technologies, Troy, MI (US)

( * ) Notice: Subject to any disclaimer, the term of this patent is extended or adjusted under 35 U.S.C. 154(b) by 208 days.

(21) Appl. No.: 10/543,273

(22) PCT Filed: Jan. 31, 2003

(86) PCT No.: PCT/IT03/00045

§ 371 (c)(1),
(2), (4) Date: Jul. 25, 2005

(87) PCT Pub. No.: WO2004/067990

PCT Pub. Date: Aug. 12, 2004

(65) Prior Publication Data

US 2006/0124415 A1    Jun. 15, 2006

(51) Int. Cl.
*F16F 9/34* (2006.01)
(52) U.S. Cl. .............................. 188/266.5; 188/322.13; 188/315
(58) Field of Classification Search ........... 188/322.13, 188/322.19, 315, 266.2, 266.5
See application file for complete search history.

(56) References Cited

U.S. PATENT DOCUMENTS 3,945,474 A * 3/1976 Palmer ................... 188/322.15
4,552,324 A   11/1985 Hrusch
4,589,528 A * 5/1986 Axthammer et al. ...... 188/266.2
4,749,070 A * 6/1988 Moser et al. ............ 188/266.2
4,872,537 A * 10/1989 Warner ..................... 188/282.9
4,958,706 A   9/1990 Richardson et al.
5,133,434 A   7/1992 Kikushima et al.
5,143,185 A * 9/1992 Klein et al. .............. 188/266.5
5,690,195 A   11/1997 Kruckemeyer et al.

FOREIGN PATENT DOCUMENTS

GB       2 123 922       2/1984

OTHER PUBLICATIONS

International Search Report dated May 9, 2003.

* cited by examiner

*Primary Examiner*—Bradley King
(74) *Attorney, Agent, or Firm*—Carlson, Gaskey & Olds

(57) ABSTRACT

A variable damper assembly (10) includes a cylinder head (42) with multiple valves (50) selectively blocking corresponding flow paths (54) to provide multiple dampening rates. Hydraulic fluid passing through flow paths (54) within the cylinder head (42) are selectively opened and closed to provide a desired dampening rate. The cylinder head (42) includes an upper part (44) and a lower part (46). The valves (50) are mounted within the upper part (44) of the cylinder head (42). Each of the valves (50) includes a plunger (56) extending into flow passages (54) defined within the lower part (46) of the cylinder head (42). Actuation of the valves (50) within the cylinder head (42) selectively opens and closes specific flow paths (54) within the lower part (46) of the cylinder head (42) to control the flow of fluid between upper and lower portions (14,16) of a dampening chamber (12).

17 Claims, 4 Drawing Sheets

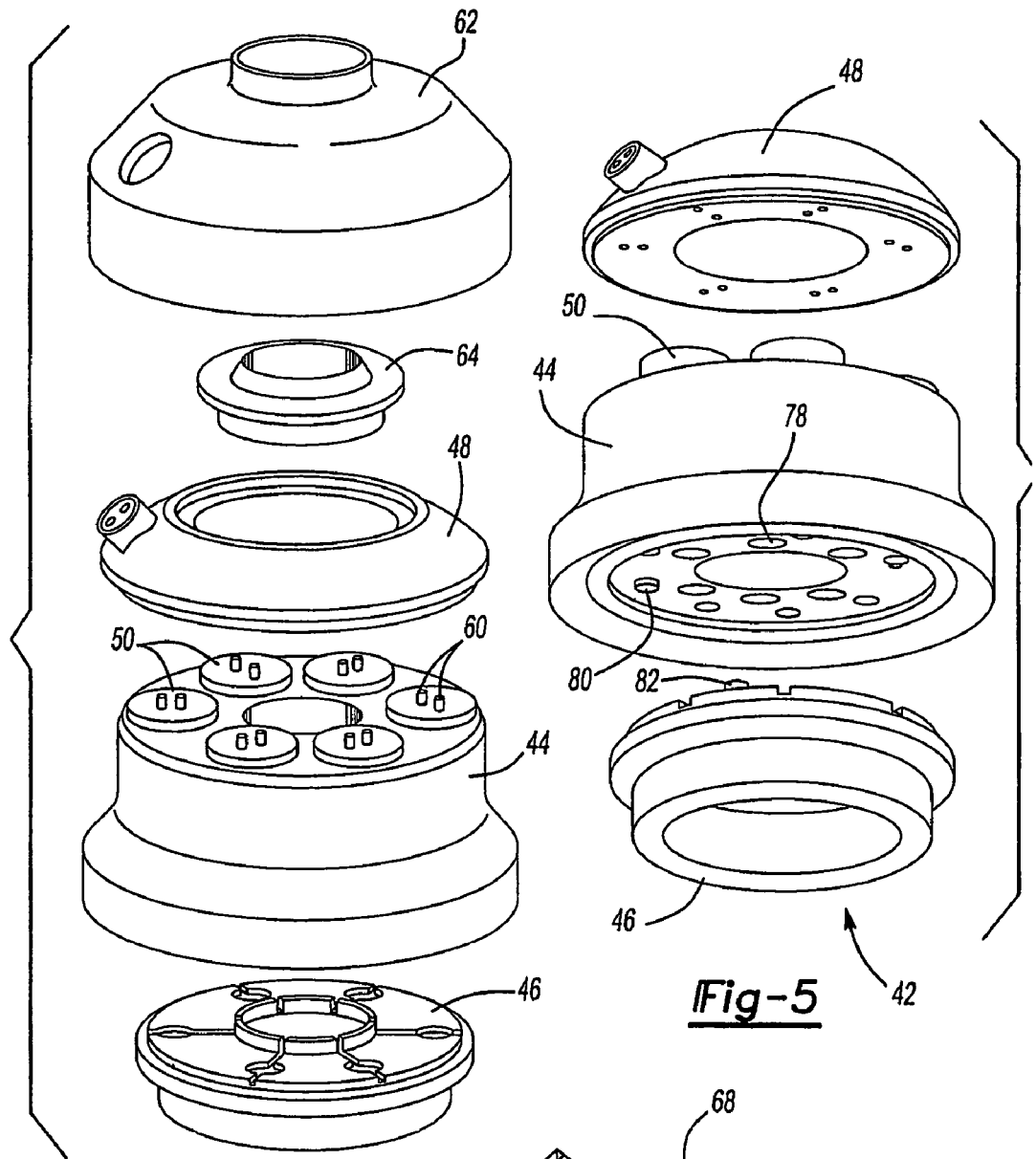
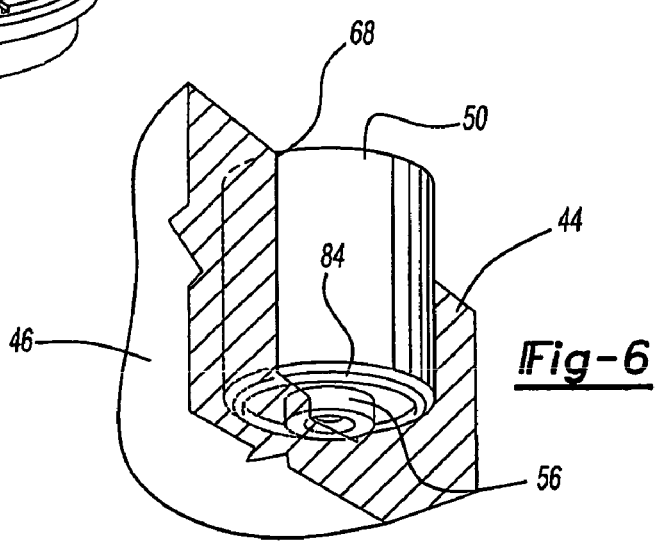
Fig-4
Fig-5
Fig-6

INTEGRATED DAMPING ADJUSTMENT VALVE

TECHNICAL FIELD

This invention relates to a variable damper assembly and specifically to a variable damper assembly including multiple on/off valves independently actuatable to vary damping characteristics.

DESCRIPTION OF THE PRIOR ART

Conventional variable damper assemblies typically include a hollow cylinder defining a damper chamber divided into two compartments by a piston assembly. Attached to the piston assembly is a rod that extends from the hollow cylinder. Regulating flow between the two chambers separated by the piston provides variable dampening. A conventional method of regulating fluid flow between the chambers includes proportionally opening a variable orifice. Changes in orifice size proportionally regulate the dampening characteristics of the damper assembly.

Typically, an electromechanical valve controls orifice size or switching between orifices of differing sizes. The electromechanical valve is typically disposed within the piston or piston rod. Location of the electromechanical valve within the piston or piston rod complicates assembly and increases the cost of the damper assembly. Further, locating the electromechanical valve within the piston or the piston rod increases overall size compared to a piston and piston rod of a conventional damper assembly. The increased size of the piston or rod increases a dead length of the damper, resulting in an overall shorter stroke. Additionally, increasing the overall size of the piston or piston rod reduces the quantity of hydraulic fluid contained in a similar sized conventional dampening chamber.

It is also known to include an external actuator to vary the damping rate of a damper assembly. In such damper assemblies, an external passage provides fluid communication between the upper and lower compartments. A valve controls flow through the external passage to vary the proportion of hydraulic fluid passing between the upper and lower compartments. The external passage and valve are susceptible to damage resulting in operational failure or leakage of hydraulic fluid.

Accordingly, it is desirable to develop a variable damper assembly capable of providing multiple dampening rates, increased dependability and reduced limitations on stroke while increasing cost effectiveness.

SUMMARY OF THE INVENTION

An embodiment of this invention is a variable damper assembly including a cylinder head including multiple valves selectively blocking corresponding flow passages to change flow restriction size and provide multiple dampening rates.

The damper assembly designed according to this invention includes an inner cylinder having first and second ends and defining a dampening chamber. The inner cylinder is surrounded by an outer cylinder. A space between the inner and outer cylinders defines an annular chamber. A piston disposed within the dampening chamber divides the dampening chamber into upper and lower portions. Flow passages within the cylinder head are selectively opened and closed to vary flow restriction size and provide a desired dampening rate.

The cylinder head includes an upper part and a lower part. Multiple valves are mounted within the upper part of the cylinder head. Each valve includes a plunger extending into a flow path defined within the lower part of the cylinder head. Actuation of the valves within the cylinder head selectively opens and closes specific flow paths within the lower part of the cylinder head to control fluid flow between upper and lower portions of the dampening chamber.

Accordingly, the damper assembly designed in accordance with this invention provides a low cost reliable variable damper assembly utilizing multiple valves selectively blocking specific flow paths to provide multiple dampening rates.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 4 is a perspective view of the top of the cylinder head;

FIG. 5 is a perspective view of the bottom of the cylinder head; and

FIG. 6 is a partial sectional view of a valve mounted within an upper part of the cylinder head.

DETAILED DESCRIPTION OF TIRE PREFERRED EMBODIMENT

Figure 1:
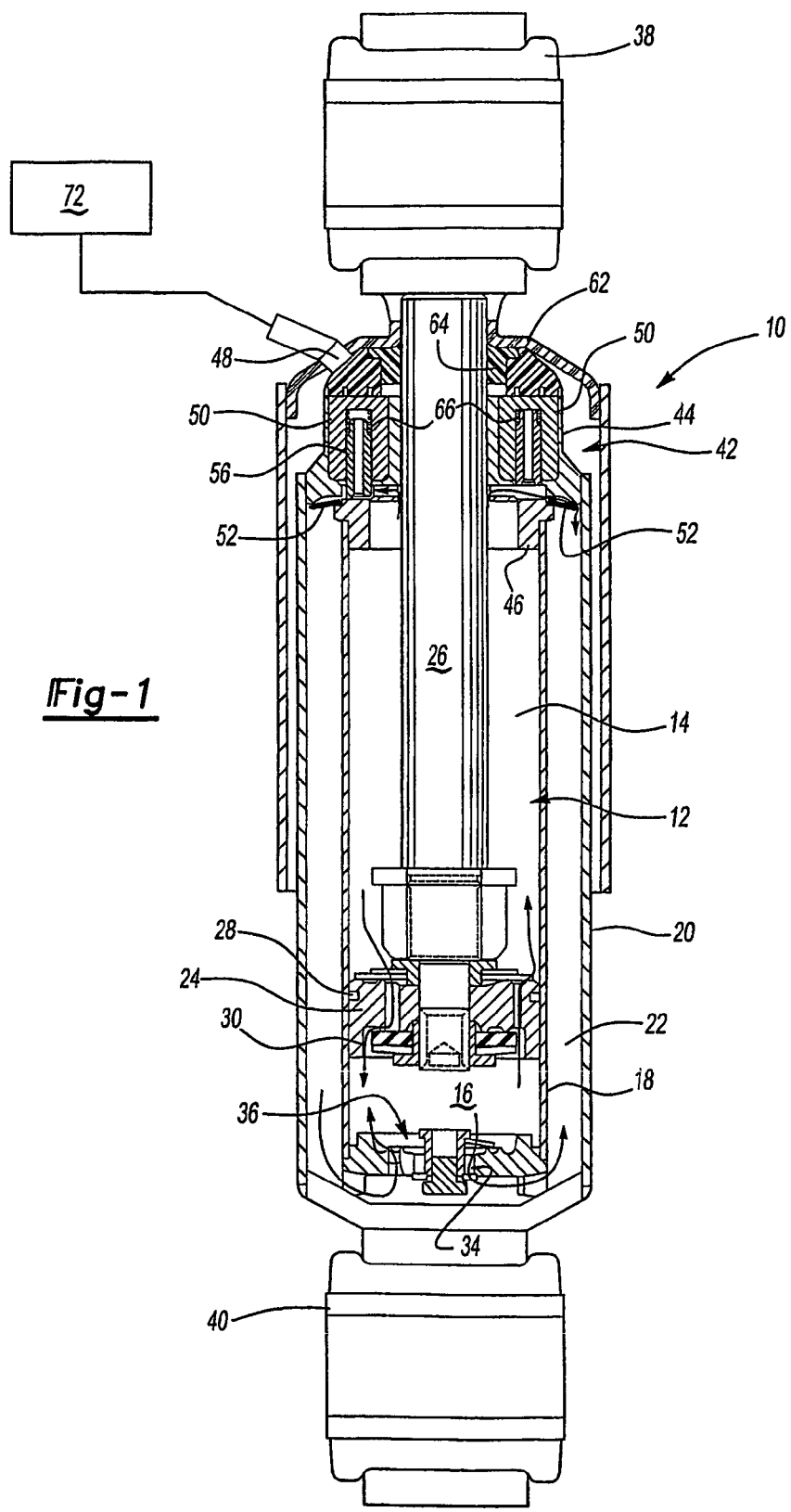
FIG. 1 is a cross-sectional view of a variable damper assembly.
Figure 2:
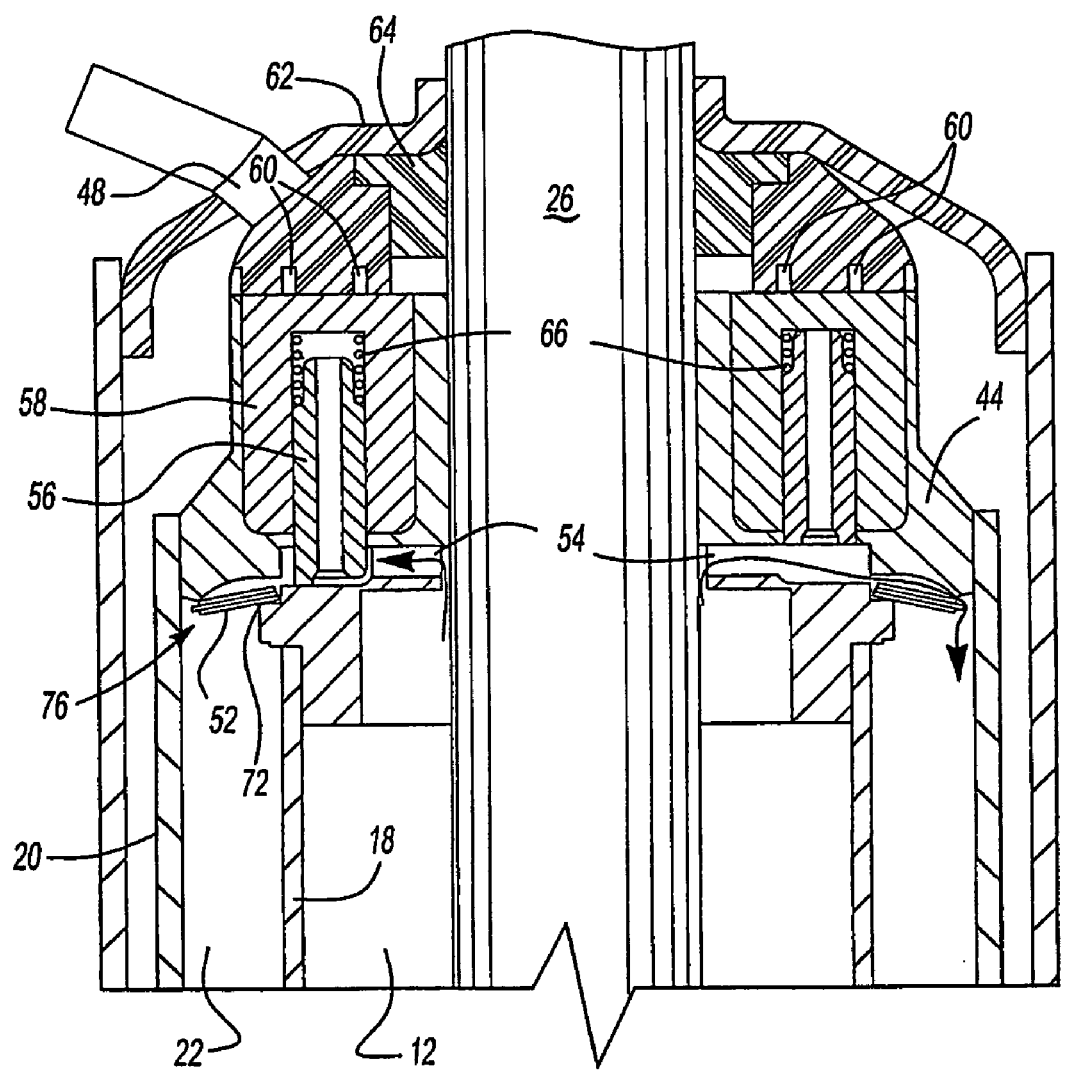
FIG. 2 is an enlarged cross-sectional view of a cylinder head of the damper assembly.

Referring to FIGS. 1 and 2, a damper assembly generally indicated at 10 includes a dampening chamber 12 defined by an inner cylinder 18. The dampening chamber 12 is divided into an upper portion 14 and a lower portion 16 by a piston 24. The piston 24 is supported within the dampening chamber 12 by shaft 26. The shaft 26 extends through a cylinder head 42 and includes a mount 38. The cylinder head 42 is disposed at a first end of the inner cylinder 18 and an end cap 32 is disposed at a second end. The cylinder head 42 includes an upper part 44 with multiple valves 50. A lower part 46 of the cylinder head 42 defines flow paths 54 for the flow of fluid between upper and lower portions 14,16 of the dampening chamber 12. Each valve 50 includes a plunger 56 selectively blocking corresponding flow paths 54 through the lower part 46 of the cylinder head 42.

The dampening chamber 12 contains a quantity of hydraulic fluid divided between the upper portion 14 and lower portion 16 of the dampening chamber 12. The inner cylinder 18 and an outer cylinder 20 define an annular chamber 22. Fluid from the dampening chamber 12 flows through the flow paths 54 within the lower part 46 of the cylinder head 42 and into the annular chamber 22. From the annular chamber 22, hydraulic fluid flows through end cap passages 34 and into the lower portion 16 of the dampening chamber 12. Movement of the piston 24 pushes hydraulic fluid between the upper and lower portions 14, 16 of the dampening chamber 12. The piston 24 includes a seal 28 preventing fluid flow around the piston 24. The piston 24 includes a flow passage 30 to allow a desired amount of fluid flow between the upper and lower portions 14, 16 of the dampening chamber 12.

The cylinder head 42 mounts onto the inner cylinder 18 and the outer cylinder 20 in a manner known to a worker skilled in the art. Preferably, six valves 50 are mounted within the upper part 44 of the cylinder head 42. Each of the valves 50 controls the flow of fluid through one of six corresponding flow paths through the lower part 46 of the cylinder head 42.

Figure 3:
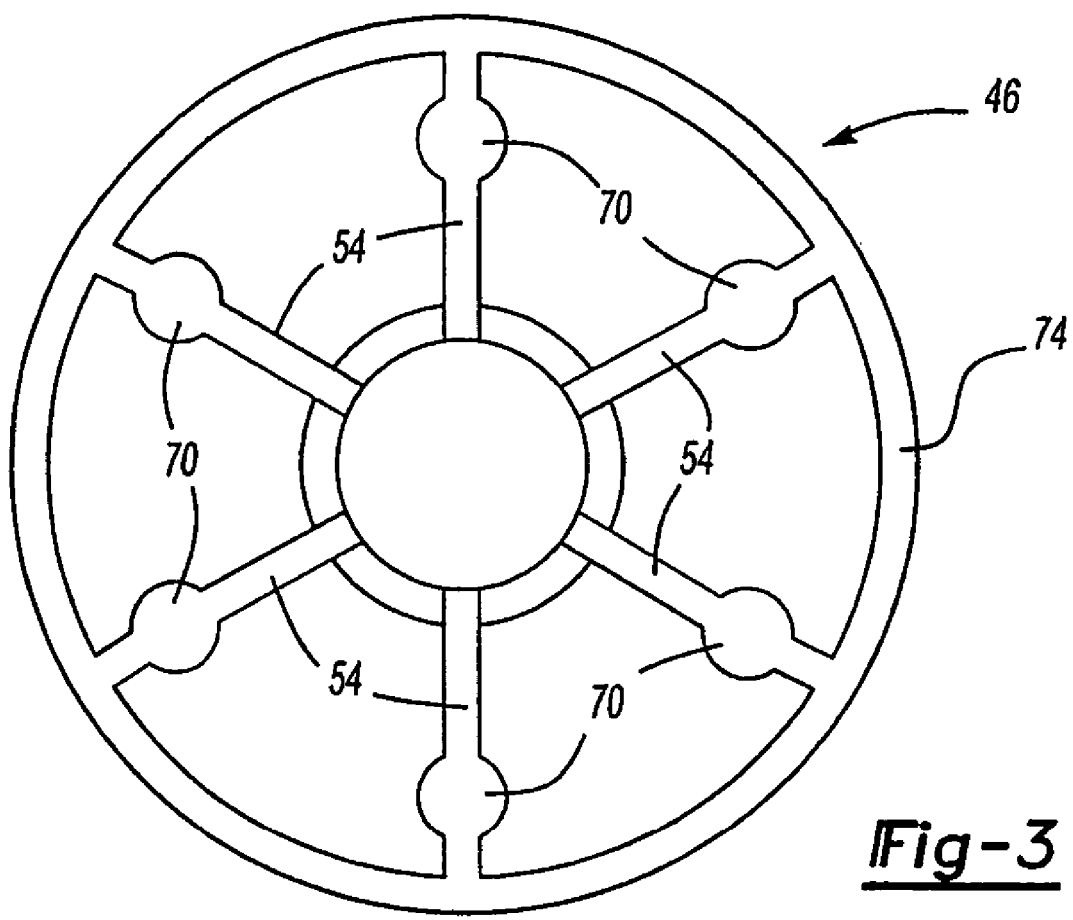
FIG. 3 is a top view of a lower part of the cylinder head.

Referring also to FIG. 3, the lower part 46 of the cylinder head 42 defines the flow paths 54. Preferably, each flow path 54 includes a plunger bore 70. A plunger 56 of each valve 50 fits within the corresponding plunger bore 70 to selectively block fluid flow though the specific flow path 54. Each flow path 54 allows a desired quantity of hydraulic fluid to pass from the dampening chamber 12 into the annular chamber 22.

Although preferably each flow path 54 is of a generally common size and shape, it is within the contemplation of this invention that separate flow paths 54 may vary in size shape and configuration to provide for varying dampening rates.

Changing the number of the flow paths 54 that are open to fluid flow changes the quantity of hydraulic fluid flowing between the upper and lower portions 14, 16 of the dampening chamber 12. Specific amounts of fluid flow correspond to specific desired dampening rates. Blocking all of the flow paths 54 allows fluid flow only through the flow passages 30 and provides one dampening rate. Opening one flow path 54 by actuation of one valve 50 provides a second dampening rate. Opening two flow paths 54 provides a third dampening rate, and additional dampening rates are provided by progressively opening additional flow paths 54.

In the illustrated embodiment, six valves 50 are used to provide seven dampening rates. A first setting is obtained with all valves 50 closed. The additional six dampening settings are obtained as one additional valve 50 is actuated to pull the plunger 56 out of the flow path 54. Although, preferably six valves 50 are used to provide seven dampening rates, it is within the contemplation of this invention to provide differing numbers of valves 50 and corresponding flow paths 54 to accommodate application specific requirements.

Referring specifically to FIG. 2, preferably, each valve 50 is an on/off valve including the plunger 56 movable between a blocked and unblocked position. A spring 66 biases the plunger 56 toward the blocked position. Each valve 50 includes a coil 58 including terminals 60. The terminals 60 are in turn connected to wiring harness 48. The wiring harness 48 is in electrical communication with a controller 72 shown schematically. The controller 72 is of a known configuration for controlling actuation of the valves 50. The coil 58 creates a magnetic field to move the plunger 56 between the blocked and unblocked positions.

Disks 52 are disposed across an opening of flow path 54 within the annular chamber 22. The disks 52 exert a biasing force against fluid flowing from the flow paths 54 into the annular chamber 22. The disks 52 exert a biasing force against fluid flow from the flow paths 54. The specific biasing force exerted by the disks 52 contributes to the dampening rate of the damper assembly 10. Preferably, a series of disks 52 are supported on a lip 72 of the lower part and a shoulder 76 on the upper part 44 of the cylinder head 42. A worker skilled in the art would understand how to achieve a desired dampening rate through selection of disks 52 to provide a specific biasing force according to application requirements.

In operation, there are preferably six valves 50 disposed about the circumference within the upper part 44 of the cylinder head 42. Each of these valves 50 are independently actuatable to selectively block or unblock flow through specific flow paths 54 corresponding with each particular valve 50. The specific combination of actuated valves 50 determines the quantity of fluid flow that is capable of flowing between the dampening chamber 12 and the annular chamber 22. As appreciated, one, two, three, four, five or all six valves 50 may be actuated simultaneously to provide desired damping rates.

Referring to FIG. 4, an exploded view of the cylinder head 42 is shown including six valves 50. Each valve 50 is mounted within individual bores 68 defined within the upper part 44 of the cylinder head 42. The wiring harness 48 connects to terminals 60 of each valve 50. A shaft seal 64 mounts the upper part 44 to prevent leakage of hydraulic fluid along the shaft 26. The shaft seal 64 and wiring harness 48 are held in place by a cap 62. The cap 62 is attached to the mount 38 and moves with the shaft 26.

Referring to FIG. 5, the cylinder head 42 is shown from the lower part 46. The plungers 56 for the valve 50 extend from the upper part 44 through one of a plurality of bores 78 into the plunger bore 70 of the lower part 46. The bores 78 are sized to accept plunger 56 such that it may extend downward into flow paths 54 defined within the lower part 46.

Referring to FIG. 6, a single valve 50 is shown in a partial cut-away view of the upper part 44 of the cylinder head 42. The bore 68 encloses substantially the entire valve 50 within the entire upper part 44 of the cylinder head 42. The valve 50 includes a seal 84 preventing leakage past the valve 50 and through the upper part 44 of the cylinder head 42.

Damper assemblies designed in accordance with this invention provide a simplified and economically feasible variable damper assembly capable of multiple dampening settings by independently actuating multiple electromechanical valves to selectively vary the amount of hydraulic fluid flowing between upper and lower portions of the dampening chamber.

The foregoing description is exemplary and not just a material specification. The invention has been described in an illustrative manner, and should be understood that the terminology used is intended to be in the nature of words of description rather than of limitation. Many modifications and variations of the present invention are possible in light of the above teachings. The preferred embodiments of this invention have been disclosed, however, one of ordinary skill in the art would recognize that certain modifications are within the scope of this invention. It is understood that within the scope of the appended claims, the invention may be practiced otherwise than as specifically described. For that reason the following claims should be studied to determine the true scope and content of this invention.

What is claimed is:

1. A variable damper assembly comprising:
   a first cylinder defining a dampening chamber having a first end and a second end;
   a piston attached to a rod, said piston dividing said dampening chamber into an upper portion and a lower portion;
   a cylinder head disposed at said first end, said cylinder head defining a plurality of flow paths between said upper portion and said lower portion within said dampening chamber;
   a plurality of electromechanical valves disposed within said cylinder head, wherein each of said plurality of electromechanical valves selectively blocks fluid flow through a corresponding one of said plurality of flow paths through said cylinder head;

a fluid passage in communication with all of said plurality of flow paths defining a flow passage to an annular chamber; and a stack of disks disposed across an opening in the fluid passage to said annular chamber that is biased against fluid flow into said annular chamber.

2. The assembly of claim 1, wherein said cylinder head includes an upper cylinder head portion and a lower cylinder head portion, said lower cylinder head portion defining said plurality of flow paths, and each of said plurality of electromechanical valves is disposed within said upper cylinder head portion.

3. The assembly of claim 2, wherein said upper cylinder head portion and said lower cylinder head portion are sintered parts.

4. The assembly of claim 1, including an end cap disposed at said second end of said first cylinder.

5. The assembly of claim 1, wherein said opening in said fluid passage comprises an annular opening and said stack of disks comprises a plurality of annular disks disposed over said annular opening in said fluid passage.

6. The assembly of claim 5, wherein said cylinder head includes an upper cylinder head portion and a lower cylinder head portion and said plurality of annular disks are supported between said upper cylinder head portion and said lower cylinder head portion.

7. The assembly of claim 1, wherein each of said plurality of electromechanical valves are independently actuatable for selectively blocking each corresponding one of said plurality of flow paths.

8. The assembly of claim 7, wherein said plurality of electromechanical valves comprises six electromechanical valves and said plurality of flow paths comprise six flow paths within said cylinder head.

9. The assembly of claim 1, wherein each of said six electromechanical valves include a plunger movable between a blocked and unblocked position.

10. The assembly of claim 1, further including a second cylinder concentric about said first cylinder defining said annular chamber.

11. The assembly of claim 1, including a wiring harness in electrical communication with each of said plurality of electromechanical valves.

12. The assembly of claim 1, including a controller in electrical communication with each of said plurality of electromechanical valves.

13. The assembly of claim 1, wherein said piston includes a passage through which fluid flows between said upper portion and said lower portion.

14. The assembly as recited in claim 6, wherein said plurality of annular disks includes an inner periphery and an outer periphery and said lower cylinder head portion includes a lip that supports said inner periphery and said outer periphery of said plurality of annular disks is biased against said upper cylinder head portion.

15. A damper assembly comprising:

a first cylinder defining a damper chamber having an upper end and a lower end;

a piston movable within said damper chamber and dividing said damper chamber into an upper damper chamber and a lower damper chamber;

a second cylinder defining an annular chamber about said first cylinder;

an end cap including a passage between said annular chamber and said damper chamber;

a cylinder head disposed on an end of said first cylinder and said second cylinder opposite said end cap, said cylinder head including an upper part and a lower part, said upper part including a plurality of electromechanical valves each controlling flow through a corresponding one of a plurality of flow passages disposed within said lower part;

an annular passage in communication with each of said plurality of flow passage in said upper part of said cylinder head, said annular passage including an annular opening into said annular chamber defined between said upper part and said lower part of said cylinder head; and an annular disk disposed within said annular passage for regulating flow from said annular passage.

16. The assembly as recited in claim 15, wherein said annular disk includes an inner periphery and an outer periphery with said inner periphery supported on said lower part of said cylinder head and said outer periphery is biased against said upper part of said cylinder heat.

17. The assembly as recited in claim 15, wherein said annular disk comprises a plurality of stacked annular disks.

* * * * *